(12) United States Patent
Nagata

(10) Patent No.: US 7,936,516 B2
(45) Date of Patent: May 3, 2011

(54) ERECTING EQUAL-MAGNIFICATION LENS ARRAY PLATE, OPTICAL SCANNING UNIT, AND IMAGE READING DEVICE

(75) Inventor: Hideshi Nagata, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 0 days.

(21) Appl. No.: 12/815,955

(22) Filed: Jun. 15, 2010

(65) Prior Publication Data

US 2010/0315718 A1    Dec. 16, 2010

Related U.S. Application Data

(60) Provisional application No. 61/187,452, filed on Jun. 16, 2009.

(51) Int. Cl.
   *G02B 27/10* (2006.01)
(52) U.S. Cl. ........................ 359/621; 359/622
(58) Field of Classification Search ........... 359/618–624
   See application file for complete search history.

(56) References Cited

U.S. PATENT DOCUMENTS

| 4,335,985 | A | * | 6/1982 | Kistler | 409/3 |
| 5,713,047 | A | * | 1/1998 | Kohayakawa | 396/18 |
| 6,192,021 | B1 | * | 2/2001 | Saito et al. | 369/53.2 |

FOREIGN PATENT DOCUMENTS

JP    2009-069801 A    4/2009

* cited by examiner

*Primary Examiner* — Joseph Martinez
*Assistant Examiner* — Brandi N Thomas
(74) *Attorney, Agent, or Firm* — Sughrue Mion, PLLC

(57) ABSTRACT

An erecting equal-magnification lens array plate includes a stack of a first lens array plate and a second lens array plate, the first lens array plate being provided with a plurality of first lenses and a plurality of second lenses, and the second lens array plate being provided with a plurality of third lenses and a plurality of fourth lenses. The erecting equal-magnification lens array plate includes a first light shielding wall provided upright to surround the first lens, a second light shielding wall provided upright to surround the fourth lens, a first aperture defined by the first light shielding wall and formed above the first lens, and a second aperture defined by the second light shielding well and formed above the fourth lens. At least one of the first aperture and the second aperture is formed such that the aperture diameter ID facing the lens is larger than the aperture diameter OD on the opposite side.

7 Claims, 6 Drawing Sheets

FIG. 10

|  | APERTURE DIAMETER ID (mm) | NOISE RATIO (%) | RATIO RELATIVE TO COMPARATIVE EXAMPLE (%) |
|---|---|---|---|
| COMPARATIVE EXAMPLE | 0.5 | 47 | 100 |
| W/LIGHT-SHIELDING MEMBER | 0.6 | 17 | 36 |
|  | 0.63 | 13 | 28 |
|  | 0.65 | 11 | 23 |
| W/O LIGHT-SHIELDING MEMBER | 0.6 | 27 | 57 |
|  | 0.63 | 27 | 57 |
|  | 0.65 | 28 | 60 |

ERECTING EQUAL-MAGNIFICATION LENS ARRAY PLATE, OPTICAL SCANNING UNIT, AND IMAGE READING DEVICE

This Application claims priority from U.S. Provisional Application No. 61/187,452, filed Jun. 16, 2009 the disclosure of which is incorporated herein by reference.

BACKGROUND OF THE INVENTION

1. Field of the Invention

The present invention relates to erecting equal-magnification lens array plates used in image reading devices and image forming devices and to optical scanning units and image reading devices using the erecting equal-magnification lens array plate.

2. Description of the Related Art

Some image reading devices such as scanners according to the related art are known to use erecting equal-magnification optics. Erecting equal-magnification optics are capable of reducing the size of devices better than reduction optics. In the case of image reading devices, an erecting equal-magnification optical system comprises a line light source, an erecting equal-magnification lens array, and a line image sensor.

A rod lens array capable of forming an erect equal-magnification image is used as an erecting equal-magnification lens array in an erecting equal-magnification optical system. Normally, a rod lens array comprises an array of rod lenses in the longitudinal direction (main scanning direction of the image reading device) of the lens array. By increasing the number of columns of rod lenses, the proportion of light transmitted is improved and unevenness in the amount of light transmitted is reduced. Due to price concerns, it is common to use one or two columns of rod lenses in a rod lens array.

Meanwhile, an erecting equal-magnification lens array plate could be formed as a stack of a plurality of transparent lens array plates built such that the optical axes of individual convex lenses are aligned, where each transparent lens array plate includes a systematic arrangement of micro-convex lenses on one or both surfaces of the plate. Since an erecting equal-magnification lens array plate such as this can be formed by, for example, injection molding, erecting equal-magnification lens arrays in a plurality of columns can be manufactured at a relatively low cost.

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating noise (also referred to as ghost) as it leaves the plate.

There is known an erecting equal-magnification lens array plate in which a light shielding wall for removing stray light not contributing to imaging is formed on the surface of the plate (see, for example, patent document No. 1).

[patent document No. 1] JP2009-069801

However, when a light shielding wall is provided on the surface of the erecting equal-magnification lens array plate, light reflected by the light shielding wall may produce flare noise.

SUMMARY OF THE INVENTION

The present invention addresses the background and a purpose thereof is to provide an erecting equal-magnification lens array plate capable of reducing flare noise, an optical scanning unit and an image reading device using such a plate.

An erecting equal-magnification lens array plate according to at least one embodiment of the present invention comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface, wherein the first lens array plate and the second lens array plate form a stack such that the second surface and the third surface face each other to ensure that a combination of the lenses associated with each other form a coaxial lens system. The erecting equal-magnification lens array plate receiving light from a line light source facing the first surface and forming an erect equal-magnification image of the line light source on an image plane facing the fourth surface. The erecting equal-magnification lens array plate comprises: a first light shielding wall provided upright to surround the first lens; a second light shielding wall provided upright to surround the fourth lens; a first aperture defined by the first light shielding wall and formed above the first lens; and a second aperture defined by the second light shielding wall and formed above the fourth lens, wherein at least one of the first aperture and the second aperture is formed such that the aperture diameter facing the lens is larger than the aperture diameter on the opposite side.

According to the embodiment, light reflected by the first light shielding wall or the fourth light shielding wall before reaching the image plane is reduced so that flare noise is reduced.

At least one of the first aperture and the second aperture may be formed such that the aperture diameter facing the lens is larger than the lens diameter.

At least one of the first aperture and the second aperture may be formed such that the aperture diameter is tapered so that it is progressively smaller away from the lens side and toward the opposite side.

A light shielding member may be provided in at least one of the first and fourth surfaces to cover an area between adjacent lenses.

An area between adjacent lenses on at least one of the first and fourth surfaces may be coarsened.

Another embodiment of the present invention relates to an optical scanning unit. The optical scanning unit comprises a line light source configured to illuminate an image to be read; an erecting equal-magnification lens array plate configured to condense light reflected by the image to be read; and a line image sensor configured to receive light transmitted by the erecting equal-magnification lens array plate.

According to the embodiment, the optical scanning unit comprises the aforementioned erecting equal-magnification lens array plate. Therefore, the line image sensor can receive an erect equal-magnification image in which flare noise is reduced.

Still another embodiment of the present invention relates to an image reading device. The device comprises: an optical scanning unit; and an image processing unit configured to process an image signal detected by the optical scanning unit.

According to this embodiment, high-quality image data in which flare noise is suitably reduced can be generated since the image reading device is formed using the optical scanning unit.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 shows how the noise ratio varies as the aperture diameter ID is varied.

DETAILED DESCRIPTION OF THE INVENTION

Figure 1:
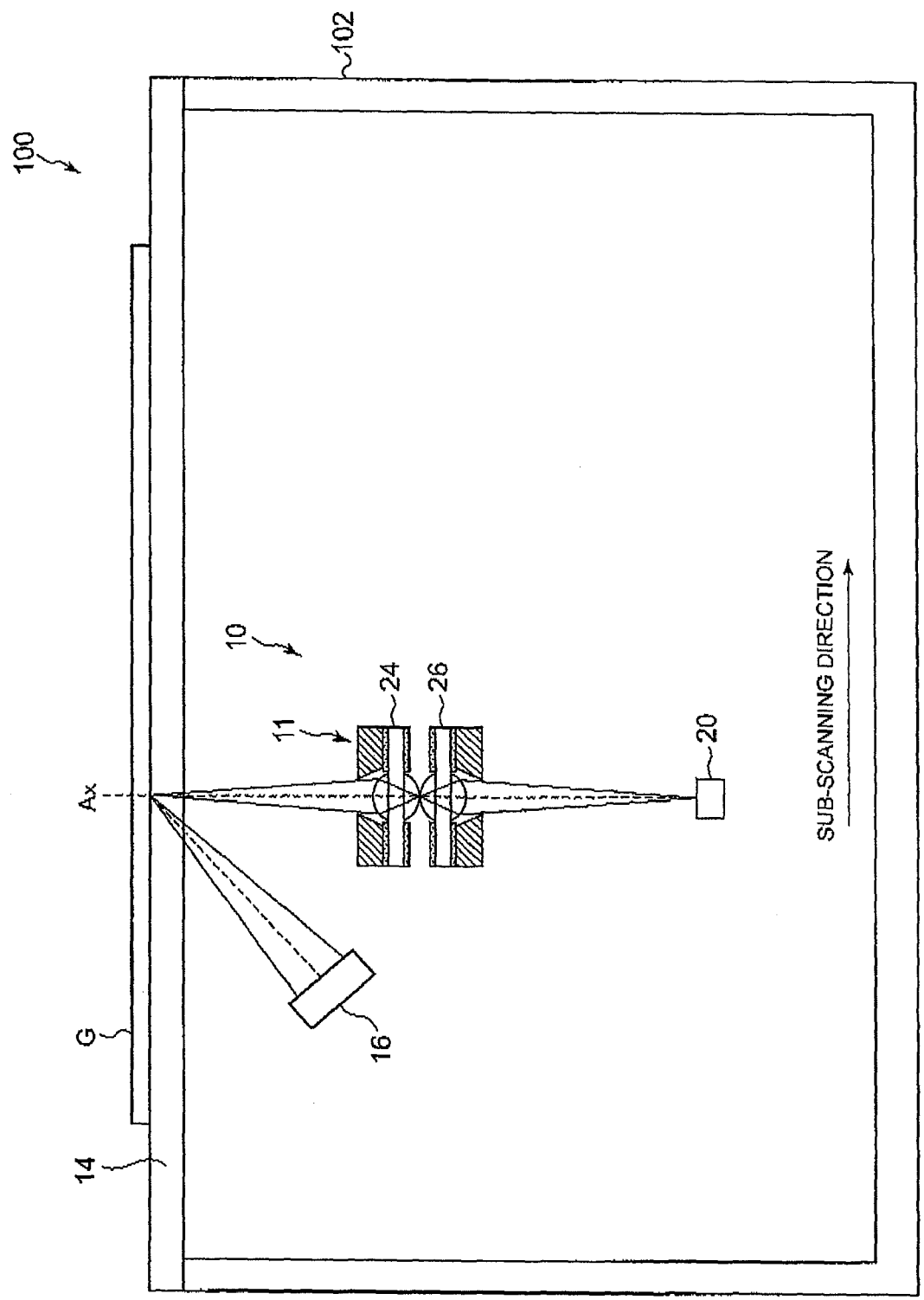
FIG. 1 shows an image reading device according to an embodiment of the present invention.

FIG. 1 shows an image reading device 100 according to an embodiment of the present invention. As shown in FIG. 1, the image reading device 100 comprises a housing 102, a glass plate 14 on which a document G is placed, an optical scanning unit 10 accommodated in the housing 102, a driving mechanism (not shown) for driving the optical scanning unit 10, and an image processing unit (not shown) for processing data read by the optical scanning unit 10.

The optical scanning unit 10 comprises a line light source 16 for illuminating a document G placed on a glass plate 14, an erecting equal-magnification lens array plate 11 for condensing light reflected from the document G, a line image sensor (photoelectric transducer) 20 for receiving light condensed by the erecting equal-magnification lens array plate 11, and a housing (not shown) for fixing the line light source 16, the erecting equal-magnification lens array plate 11, and the line image sensor 20.

The line light source 16 is a light source emitting a substantially straight light. The line light source 16 is fixed such that the optical axis of the illuminating light passes through the intersection between the optical axis Ax of the erecting equal-magnification lens array plate 11 and the top surface of the glass plate 14. The light exiting the line light source 16 irradiates the document G placed on the glass plate 14. The light illuminating the document G is reflected by the document G toward the erecting equal-magnification lens array plate 11.

The erecting equal-magnification lens array plate 11 comprises a stack of a first lens array plate 14 and a second lens array plate 26 built such that pairs of corresponding lenses form a coaxial lens system, where each lens array plate is formed with a plurality of convex lenses on both surfaces of the plate. The first lens array plate 24 and the second lens array plate 26 are held by a holder (not shown) in a stacked state. The erecting equal-magnification lens array plate 11 is installed in the image reading device 100 such that the longitudinal direction thereof is aligned with the main scanning direction and the lateral direction thereof is aligned with the sub-scanning direction.

The erecting equal-magnification lens array unit 11 is configured to receive substantially line light reflected from the document G located above and form an erect equal-magnification image on an image plane located below, i.e., a light-receiving surface of the line image sensor 20. The image reading device 100 is adapted to read the document G by scanning the document G using the optical scanning unit 10 in the sub-scanning direction.

Figure 2:
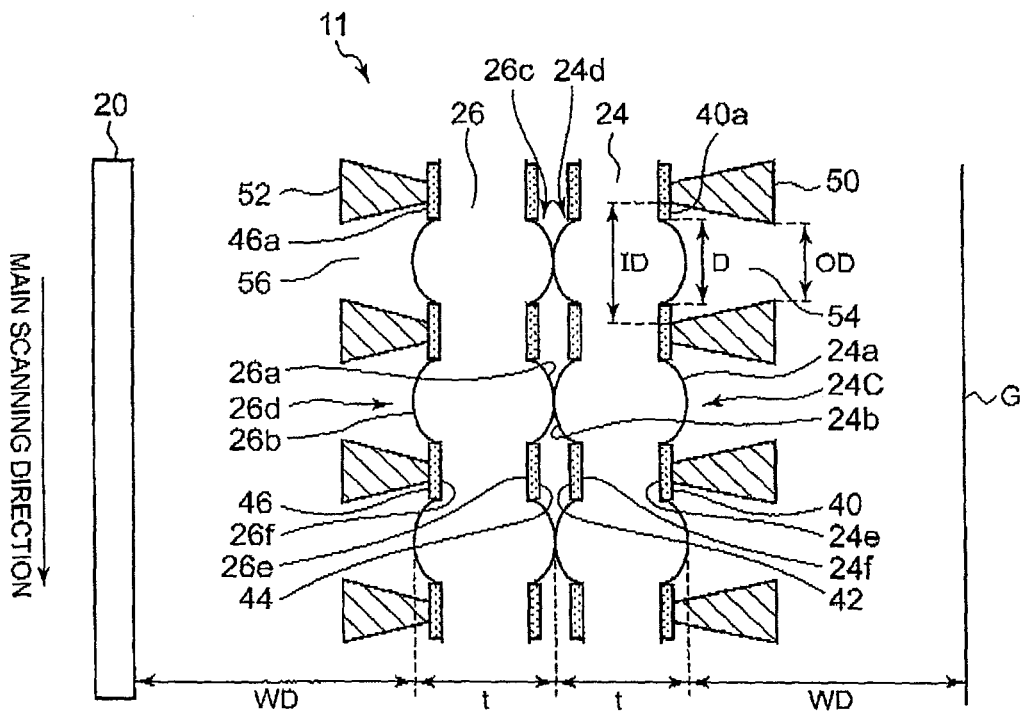
FIG. 2 shows a sectional view of a partial optical scanning unit in the main scanning direction.
Figure 3:
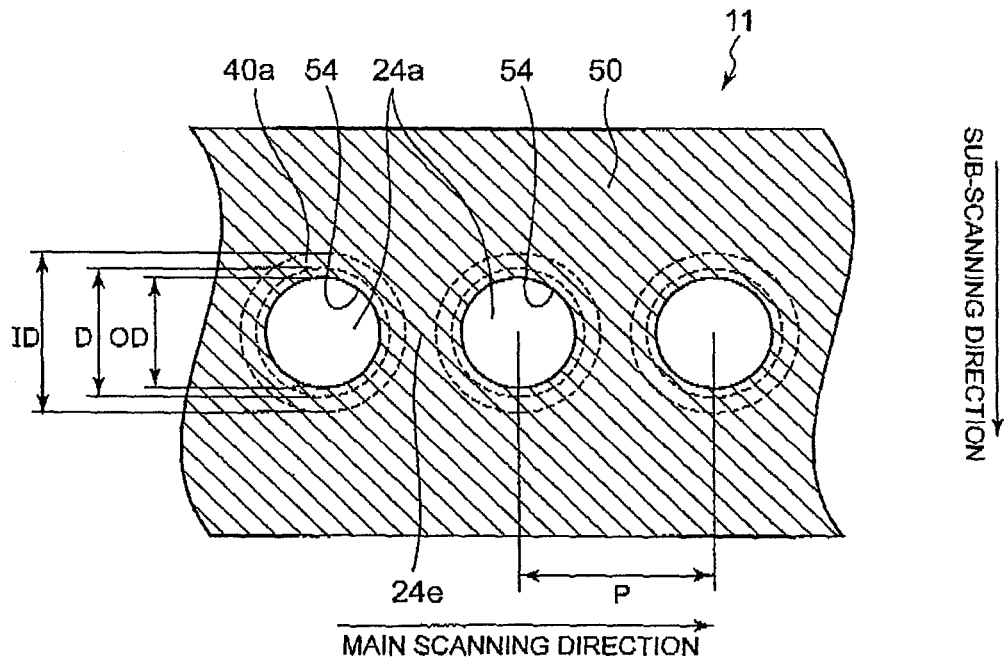
FIG. 3 is a top view of a partial section of the erecting equal-magnification lens array plate viewed from a document.

A description will now be given, with reference to FIGS. 2 and 3, of the erecting equal-magnification lens array plate 11 according to the embodiment. FIG. 2 shows a sectional view of a partial optical scanning unit 10 in the main scanning direction. Referring to FIG. 2, the vertical direction in the illustration represents main scanning direction (longitudinal direction) of the erecting equal-magnification lens array plate 11 and the depth direction in the illustration represents the sub-scanning direction (lateral direction). FIG. 3 is a top view of a partial section of the erecting equal-magnification lens array plate 11 viewed from a document. Referring to FIG. 3, the horizontal direction in the illustration represents the main scanning direction (longitudinal direction) of the erecting equal-magnification lens array plate 11 and the vertical direction in the illustration represents the sub-scanning direction (lateral direction).

As described above, the erecting equal-magnification lens array plate 11 is formed as a stack of the first lens array plate 24 and the second lens array plat 26. Each of the first lens array plate 24 and the second lens array plate 26 is a rectangular plate having a thickness t and is provided with an arrangement of a plurality of convex lenses on both sides thereof.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorption. Desired materials include cycloolefin resins, olefin resins, norbornene resins, and polycarbonate.

A plurality of first lenses 24a are arranged in a single line on a first surface 24c (one of the surfaces of the first lens array plate 24) at a lens pitch P in the longitudinal direction of the first lens array plate 24. The lens diameter D of the first lens 24a is configured to be smaller than the lens pitch P. Therefore, a first flat part 24e not formed with a lens is provided between the adjacent first lenses 24a. A plurality of second lenses 24b having a lens diameter D are arranged in a single line on a second surface 24d of the first lens array plate 24 opposite to the first surface 24c at a lens pitch P in the longitudinal direction of the first lens array plate 24. A second flat part 24f is provided between the adjacent second lenses 24b. In this embodiment, the term "lens diameter D" refers to a diameter of a portion having the function of a lens. In other words, the lens diameter D refers to the diameter of the lens portion not covered by a light shielding member.

A plurality of third lenses 26a having a lens diameter D are arranged in a single line on a third surface 26c (one of the surfaces of the second lens array plate 26) at a lens pitch P in the longitudinal direction of the second lens array plate 26. A third flat part 26e is provided between the adjacent third lenses 26a. A plurality of fourth lenses 26b having a lens diameter D are arranged in a single line on a fourth surface 26d opposite to the third surface 26c at a lens pitch P in the longitudinal direction of the second lens array plate 26. A fourth flat part 26f is provided between the adjacent fourth lenses 26b.

In this embodiment, it is assumed that the first lens 24a, the second lens 24b, the third lens 26a, and the fourth lens 26b are spherical in shape. Alternatively, the lenses may have aspherical shapes.

A first light shielding member 40 is provided on the first surface 24c of the first lens array plate 24. The first light shielding member 40 is provided to cover the area on the first surface 24c outside the effective region of the first lenses 24a. Transmission of light through the first flat part 24e is prevented due to the first light shielding member 40. The term "effective region of a lens" refers to a portion having the function of a lens.

Similarly, a second light shielding member 42, a third light shielding member 44, a fourth light shielding member 46 are provided on the second surface 24d, the third surface 26c, and the fourth surface 26d. The second light shielding member 42, the third light shielding member 44, and the fourth light shielding member 46 prevents light from being transmitted through the second flat part 24f, the third flat part 26e, and the fourth flat part 26f.

The first light shielding member 40, the second light shielding member 42, the third light shielding member 44, and the fourth light shielding member 46 may be formed by printing the first surface 24c, the second surface 24d, the third surface 26c, and the fourth surface 26d with a light shielding pattern using a light-absorbing material such as black ink. The first light shielding member 40, the second light shielding member 42, the third light shielding member 44, and the fourth light shielding member 46 may not be formed directly on the first surface 24c, the second surface 24d, the third surface 26c, and the fourth surface 26d but may be provided at a distance from the first surface 24c, the second surface 24d, the third surface 26c, and the fourth surface 26d. The second light shielding member 42 and the third light shielding member 44 may be combined into a single light shielding member. In this case, the light shielding member as combined may be provided between the first lens array plate 24 and the second lens array plate 26.

In this embodiment, a first light shielding wall 50 is provided upright on the first light shielding member 40 of the first surface 24c so as to cover a space around the first lenses 24a. The first light shielding wall 50 defines a first aperture 54 above each of the first lenses 24a. The first light shielding wall 50 functions as a light shielding member for preventing stray light from entering the first lens 24a. The height of the first light shielding wall 50 is set to remove light entering at an angle larger than a predetermined maximum angle of view. FIG. 2 shows that the first light shielding wall 50 is in contact with the first light shielding member 40. Alternatively, a gap may be provided between the first light shielding wall 50 and the first light shielding member 40.

As shown in FIG. 3, the first aperture 54 is a circular opening in a top view and is arranged so that the center thereof is located on the optical axis of the first lens 24a. Further, as shown in FIG. 2, the first aperture 54 is formed such that the aperture diameter is tapered so that it is progressively smaller away from the first lens 24a and toward the document G. Therefore, the first aperture 54 is formed such that the aperture diameter ID facing the first lens 24a is larger than the aperture diameter OD toward the document G.

Further, the first aperture 54 is formed such that the aperture diameter ID facing the first lens 24a is larger than the lens diameter D of the first lens 24a. Therefore, an area 40a of the first light shielding member 40 not covered by the first light shielding wall 50 (hereinafter referred to as a first light shielding member exposed area 40a) is formed around the first lens 24a. FIGS. 2 and 3 show that the lens diameter D of the first lens 24a is larger than the aperture diameter OD. Alternatively, the lens diameter may be equal to or smaller than the aperture diameter OD.

Similarly, a second light shielding wall 52 is provided upright on the fourth light shielding member 46 of the fourth surface 26d so as to cover a space around each of the fourth lenses 26b. A second aperture 56 is defined by the second light shielding wall 52 above each of the fourth lenses 26b. The second light shielding wall 52 functions as a light shielding member for preventing stray light from exiting the fourth lens 26b. The height of the second light shielding wall 52 is configured to be identical to that of the first light shielding wall 50. FIG. 2 shows that the second light shielding wall 52 is in contact with the fourth light shielding member 46. Alternatively, a gap may be provided between the second light shielding wall 52 and the fourth light shielding member 46.

As shown in FIG. 2, the second aperture 56 is formed such that the aperture diameter is tapered so that it is progressively smaller away from the fourth lens 26b and toward the line image sensor 20. Therefore, the second aperture 56 is formed such that the aperture diameter thereof facing the fourth lens 26b is larger than the aperture diameter toward the line image sensor 20.

The second aperture 56 is formed such that the aperture diameter facing the fourth lens 26b is larger than the lens diameter D of the fourth lens 26b. Therefore, an area 46a of the fourth light shielding member 46 not covered by the second light shielding wall 52 (hereinafter referred to as a fourth light shielding member exposed area 46a) is formed around the fourth lens 26b.

The first light shielding wall 50 and the second light shielding wall 52 may be formed by, for example, injection molding using a light absorbing material such as black ABS resin. The first light shielding wall 50 and the second light shielding wall 52 may be formed by coating the first surface 24c and the fourth surface 26d with a stack of black resin paint.

The first lens array plate 24 and the second lens array plate 26 formed with the light shielding member and the light shielding wall form a stack such that the second surface 24d and the third surface 26c face each other to ensure that a combination of the first lens 24a, second lens 24b, third lens 26a, and fourth lens 26b associated with each other form a coaxial lens system. While it is assumed in this embodiment that the second lens 24b on the second surface 24d and the third lens 26a on the third surface 26c are in contact with each other, the second lens 24b and the third lens 26a may be at a distance from each other.

The erecting equal-magnification lens array plate 11 as configured above is built in the image reading device 100 such that the distance from the first lens 24a to the document G and the distance from the fourth lens 26b to the line image sensor 20 are equal to a predetermined working distance WD.

Figure 4:
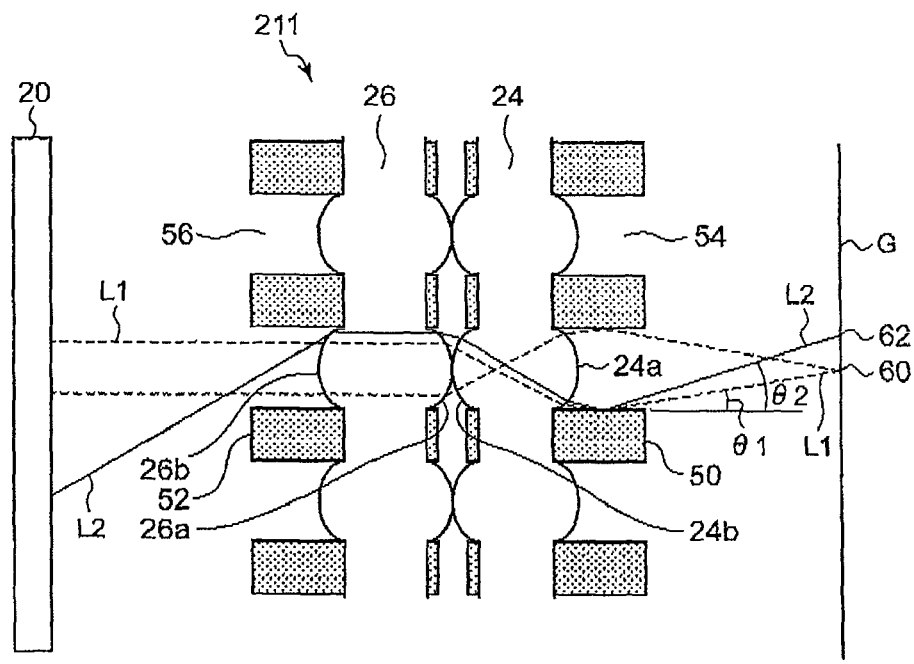
FIG. 4 shows the operation of the erecting equal-magnification lens array plate according to a comparative example.

A description will now be given of the operation of the erecting equal-magnification lens array plate 11 according to the embodiment. Before describing the operation of the erecting equal-magnification lens array plate 11, a comparative example will be shown. FIG. 4 shows the operation of an erecting equal-magnification lens array plate 211 according to a comparative example. In the erecting equal-magnification lens array plate 211 according to the comparative example, the first light shielding wall 50 and the second light shielding wall 52 are formed such that the first aperture 54 and the second aperture 56 are columnar in shape.

First, the light L1 (broken line) emitted from a point 60 on the document G located on the optical axis of the first lens 24a will be discussed. Normally, light L1 about to be incident on the first lens array plate 24 at an angle of incidence θ1 larger than the imaging light is absorbed by the first light shielding wall 50. However, the light L1 is not completely absorbed by the first light shielding wall 50 even if a light absorbing material is used to form the wall 50. The light L1 is partly incident on the first lens 24a due to Fresnel reflection. As shown in FIG. 4, the light L1 reflected by the first light shielding wall 50 is transmitted through the first lens 24a, the second lens 24b, the third lens 26a, and the fourth lens 26b before being incident on the line image sensor 20, causing flare noise.

Secondly, light L2 (solid line) emitted from a point 62 on the document G outside the optical axis of the first lens 24a will be discussed. In this case, part of the light L2 about to be incident on the first lens array plate 24 at an angle θ2 larger than the angle θ1 undergoes Fresnel reflection by the first light shielding wall 50. The light L2 is transmitted through the first lens 24a, the second lens 24b, the third lens 26a, and the fourth lens 26b before being incident on the line image sensor 20, causing flare noise.

Flare noise caused by the reflection by the first light shielding wall 50 is described with reference to FIG. 4. Flare noise is also caused by the reflection by the second light shielding wall 52.

Figure 5:
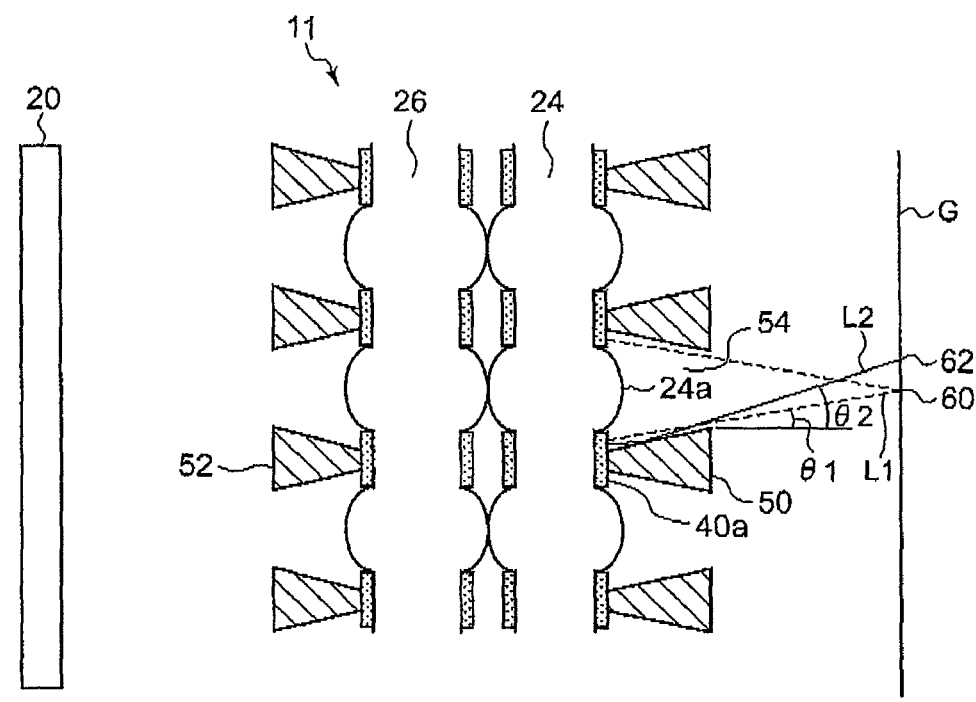
FIG. 5 shows the operation of the erecting equal-magnification lens array plate according to an embodiment.

FIG. 5 shows the operation of the erecting equal-magnification lens array plate 11 according to an embodiment. As in the case of the comparative example of FIG. 4, the light L1 (broken line) emitted from the point 60 on the document G located on the optical axis of the first lens 24a and about to be incident on the first lens array plate 24 at the angle of incidence θ1 will be discussed. Since the first aperture 54 is formed such that the aperture diameter ID facing the first lens 24a is larger than the aperture diameter OD toward the document G, the light L1 is directly incident on the first light shielding member exposed area 40a without impinging upon the first light shielding wall 50 and is absorbed thereby. Therefore, flare noise caused by the light L1 is not produced.

The light L2 (solid line) emitted from a point 62 on the document G outside the optical axis of the first lens 24a and about to be incident on the first lens array plate 24 at the angle θ2 will be discussed. The light L2 is reflected by the first light shielding wall 50. In this embodiment, the first aperture 54 is formed such that the aperture diameter is tapered so that it is progressively smaller away from the first lens 24a and toward the document G. Therefore, the angle of incidence of the reflected light L2 on the first lens array plate 24 is smaller than in the case of FIG. 4. Therefore, the light L2 reflected by the first light shielding wall 50 is incident on the first light shielding member exposed area 40a instead of the first lens 24a. Therefore, flare noise due to the light L2 is not produced.

The action of reducing flare noise caused by reflection by the first light shielding wall 50 is described with reference to FIG. 5, flare noise caused by reflection by the second light shielding wall 52 is similarly reduced by forming the second light shielding wall 52 as described above.

As described above, the erecting equal-magnification lens array plate 11 is capable of reducing flare noise caused by reflection by the first light shielding wall 50 and the second light shielding wall 52. The erecting equal-magnification lens array plate 11 is capable of removing stray light diagonally incident on the erecting equal-magnification lens array plate 11 and producing ghost, using the first light shielding wall 50 or the second light shielding wall 52. Accordingly, the erecting equal-magnification lens array plate according to this embodiment can form high-quality erect equal-magnification images with reduced noise.

In the erecting equal-magnification lens array plate 11 shown in FIG. 2, both the first aperture 54 and the second aperture 56 are formed such that the aperture diameter near the lens is larger than the diameter on the opposite side. However, flare noise is advantageously reduced by forming at least one of the first aperture 54 and the second aperture 56 such that the aperture diameter facing the lens is larger than the diameter on the opposite side.

Figure 6:
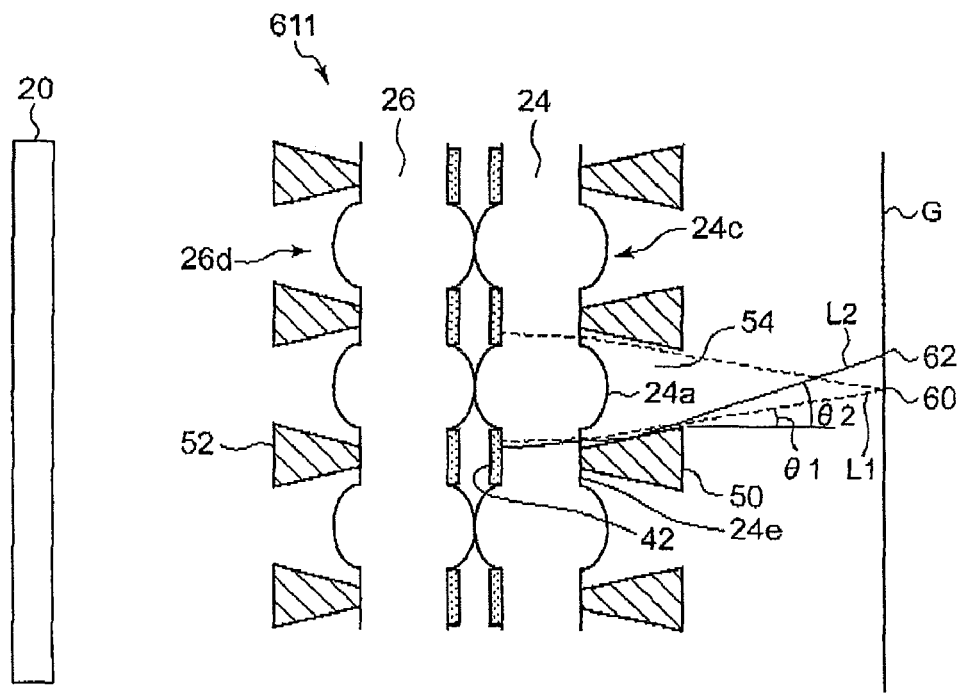
FIG. 6 shows the erecting equal-magnification lens array plate according to another embodiment.

FIG. 6 shows an erecting equal-magnification lens array plate 611 according to another embodiment. The erecting equal-magnification lens array plate 611 according to this embodiment is different from the erecting equal-magnification lens array plate 11 shown in FIG. 2 in that the first light shielding member and the fourth light shielding member are not provided and that the first light shielding wall 50 and the second light shielding wall 52 are directly provided on the first surface 24c and the fourth surface 26d. The other components are similar to those of the erecting equal-magnification lens array plate 11 shown in FIG. 2 so that like numerals represent like elements and the description is omitted as appropriate.

A description will now be given of the operation of the erecting equal-magnification lens array plate 611 thus configured. As in the case of the FIGS. 4 and 5, the light L1 (broken line) emitted from the point 60 on the document G located on the optical axis of the first lens 24a and about to be incident on the first lens array plate 24 at the angle of incidence θ1 will be discussed. Since the first aperture 54 according to this embodiment is also formed such that the aperture diameter facing the first lens 24a is larger than the aperture diameter toward the document G, the light L1 does not impinge upon the first light shielding wall 50. However, since the first light shielding member is not provided on the first flat part 24e in this embodiment, the light L1 is incident on the first lens array plate 24 via the first flat part 24e. The light L1 is then incident on the second light shielding wall 42 and is absorbed there.

The light L2 (solid line) emitted from the point 62 on the document G outside the optical axis of the first lens 24a and about to be incident on the first lens array plate 24 at the angle θ2 will be discussed. The light L2 is reflected by the first light shielding wall 50. In this embodiment, too, the first aperture 54 is formed such that the aperture diameter is tapered so that it is progressively smaller away from the first lens 24a and toward the document G. Therefore, the angle of incidence of the reflected light L2 on the first lens array plate 24 is smaller than in the case of FIG. 4. However, since the first light shielding member is not provided on the first flat part 24e in this embodiment, the light L2 is incident on the first lens array plate 24 via the first flat part 24e. The light L1 is then incident on the second light shielding wall 42 and absorbed there.

As described above, the erecting equal-magnification lens array plate 611 also facilitates reduction of flare noise caused by reflection by the first light shielding wall 50 and the second light shielding wall 52. Since the first light shielding member and the fourth light shielding member are not provided on the first surface 24c and the fourth surface 26d, respectively, the number of steps to manufacture the erecting equal-magnification lens array plate 611 is advantageously reduced.

Figure 7:
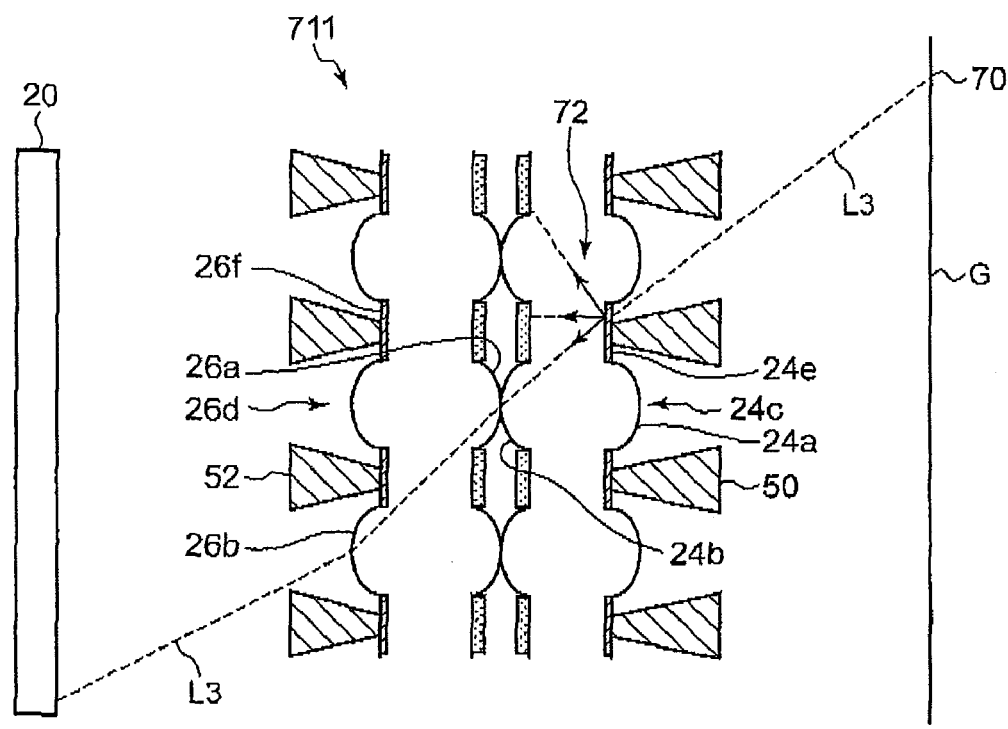
FIG. 7 shows the erecting equal-magnification lens array plate according to still another embodiment.

FIG. 7 shows an erecting equal-magnification lens array plate 711 according to still another embodiment. As in the case of the erecting equal-magnification lens array plate 611 shown in FIG. 6, the erecting equal-magnification lens array plate 711 according to this embodiment is configured such that the first light shielding member and the fourth light shielding member are not provided on the first surface 24c and the fourth surface 26d, respectively. Further, the erecting equal-magnification lens array plate 711 is configured such that the first flat part 24e of the first surface 24c and the fourth flat part 26f of the fourth surface 26d are coarsened. The other components are similar to those of the erecting equal-magnification lens array plate 11 shown in FIG. 2 so that like numerals represent like elements and the description is omitted as appropriate. The surface may be coarsened by forming a coarsened portion in a mold for injection molding for forming the lens array plate. Alternatively, the surface may be coarsened by blasting or etching the injection-molded product.

A description will now be given of the operation of the erecting equal-magnification lens array plate 711 thus configured. Light L3 (broken line) emitted from a point 70 on the document G and about to be incident on the first flat part 24e of the first surface 24c at a large angle of incidence will be discussed. As shown in FIG. 7, the light L3 is transmitted through the second lens 24b, the third lens 26a, and the fourth lens 26b before being incident on the line image sensor 20, causing ghost noise. If the first flat part 24.e is not coarsened, most of the light L3 incident on the first flat part 24e contributes to the ghost noise.

Since the first flat part 24e of the erecting equal-magnification lens array plate 711 according to this embodiment is coarsened, the light L3 is scattered by the coarsened first flat part 24e as indicated by an arrow 72 of FIG. 7. Accordingly, the amount of light L3 reaching the line image sensor 20 is reduced and so the ghost noise is reduced. The advantage of reducing flare noise is as described in the case of the erecting equal-magnification lens array plate 11 shown in FIG. 2.

In the erecting equal-magnification lens array plate 711 shown in FIG. 7, both the first flat part 24e and the fourth flat part 26f are coarsened. However, the ghost noise is reduced by coarsening only one of the parts.

Figure 8:
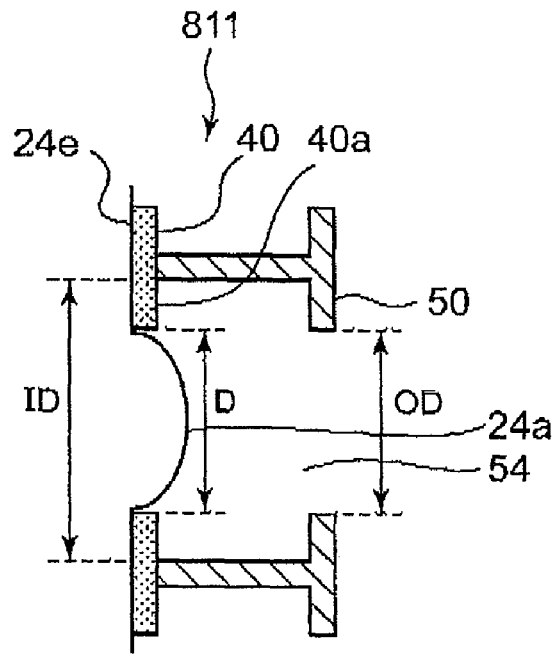
FIG. 8 shows the erecting equal-magnification lens array plate according to yet another embodiment.

FIG. 8 shows an erecting equal-magnification lens array plate 811 according to yet another embodiment. FIG. 8 is an enlarged view of one of the first lenses 24a and the neighborhood thereof. As shown in FIG. 8, the erecting equal-magnification lens array plate 811 according to this embodiment is different from the erecting equal-magnification lens array plate 11 shown in FIG. 2 in respect of the shape of the first aperture 54.

In this embodiment, too, the first aperture 54 is formed such that the aperture diameter ID facing the first lens 24a is larger than the aperture diameter OD on the opposite side. Further, the first aperture 54 is formed such that the aperture diameter ID facing the first lens 24a is larger than the lens diameter D of the first lens 24a. In this embodiment, the first aperture 54 is formed such that the aperture diameter (ID) remains constant from the end facing the first lens 24a through the neighborhood of the end facing the document. Only the diameter at the end facing the document is formed to be smaller than ID. The first aperture 54 formed as described above also facilitates reduction of flare noise since the light reflected by the first light shielding wall 50 is absorbed by the first light shielding member exposed area 40a.

Figure 9:
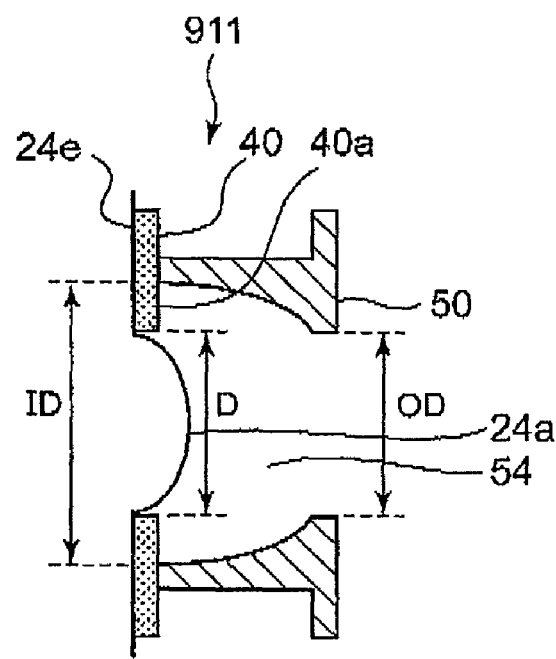
FIG. 9 shows the erecting equal-magnification lens array plate according to still another embodiment.

FIG. 9 shows an erecting equal-magnification lens array plate 911 according to still another embodiment. FIG. 9 is an enlarged view of one of the first lenses 24a and the neighborhood thereof. As shown in FIG. 9, the erecting equal-magnification lens array plate 911 according to this embodiment is different from the erecting equal-magnification lens array plate 11 shown in FIG. 2 in respect of the shape of the first aperture 54.

In this embodiment, too, the first aperture 54 is formed such that the aperture diameter ID facing the first lens 24a is larger than the aperture diameter OD on the opposite side. Further, the first aperture 54 is formed such that the aperture diameter ID facing the first lens 24a is larger than the lens diameter D of the first lens 24a. In this embodiment, the first aperture 54 is formed such that the aperture diameter is progressively smaller away from the first lens 24a and toward the document in a curved fashion. The first aperture 54 formed as described above also facilitates reduction of flare noise since the light reflected by the first light shielding wall 50 is absorbed by the first light shielding member exposed area 40a.

FIG. 10 shows how the noise ratio varies as the aperture diameter ID is varied. A ray tracing simulation was conducted. The entirety of the erecting equal-magnification lens array plate is illuminated in the main scanning direction by a 90° Lambertian emission from a point light source. The amount of imaging light arriving at a specified point on the image plane is designated as the amount of imaging light transmitted. The amount of light arriving elsewhere is designated as the amount of light transmitted as noise. The illumination and measurement are conducted on a line extending in the main scanning direction. A noise ratio is defined as a sum of the amount of light transmitted as noise divided by the amount of imaging light transmitted.

The conditions of simulation are such that the lenses are arranged in a single line, the lens's working distance WD=3.3 mm, the plate thickness t of the first and second lens array plates is such that t=1.6 mm, the lens pitch=0.65 mm, the lens diameter=0.5 mm, the refractive index n=1.53, the height of the first and second light shielding walls=0.7 mm, and the aperture diameter OD=0.5 mm. Using these parameters, the aperture diameter ID is made to vary such that the diameter is 0.6 mm, 0.63 mm, and 0.65 mm under two different conditions, i.e., one in which the shielding member is provided and one in which it is not. A comparative simulation was conducted where the aperture diameter ID is equal to the aperture diameter OD (ID=OD=0.5 mm). Reduction in noise ratio relative to this comparative example is identified. More specifically, the simulation in FIG. 10 performed under the condition in which the shielding member is provided models the erecting equal-magnification lens array plate 11 shown in FIG. 2. The simulation performed under the condition in which the shielding member is not provided models the erecting equal-magnification lens array plate 611 shown in FIG. 6. The simulation of the comparative example of FIG. 10 models the erecting equal-magnification lens array plate 211 shown in FIG. 4.

As shown in FIG. 10, the noise ratio is 47% in the comparative example where the aperture diameter ID is 0.5 mm. Meanwhile, when the aperture diameter ID is configured to be larger than the aperture diameter OD, the noise ratio is smaller than in the comparative example irrespective of whether the shielding member is provided. In particular, when the shielding member is provided and the aperture diameter ID=0.65 mm, the noise ratio is 11%, i.e., the noise ratio is reduced to 23% of the ratio according to the comparative example. The simulation verifies that the erecting equal-magnification lens array plate according to the preferred embodiment is useful to reduce noise.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described, lenses on the respective lens surfaces are arranged in a single row in the main scanning direction. Alternatively, lenses may be arranged in two rows in the main scanning direction or arranged in a square array.

In this embodiment, it is assumed that the light shielding wall and the light shielding member are separate. Alternatively, the wall and the member may be formed as one piece.

What is claimed is:

1. An erecting equal-magnification lens array plate comprising:
    a first lens array plate provided with a plurality of first lenses systematically arranged on a first surface and a plurality of second lenses systematically arranged on a second surface opposite to the first surface; and
    a second lens array plate provided with a plurality of third lenses systematically arranged on a third surface and a plurality of fourth lenses systematically arranged on a fourth surface opposite to the third surface,
    wherein the first lens array plate and the second lens array plate form a stack such that the second surface and the third surface face each other to ensure that a combination of the lenses associated with each other form a coaxial lens system,
    the erecting equal-magnification lens array plate receiving light from a line light source facing the first surface and forming an erect equal-magnification image of the line light source on an image plane facing the fourth surface,
    the erecting equal-magnification lens array plate comprising:
    a first light shielding wall provided upright to surround the first lens;
    a second light shielding wall provided upright to surround the fourth lens;
    a first aperture defined by the first light shielding wall and formed above the first lens; and
    a second aperture defined by the second light shielding wall and formed above the fourth lens,
    wherein at least one of the first aperture and the second aperture is formed such that the aperture diameter facing the lens is larger than the aperture diameter on the opposite side.

2. The erecting equal-magnification lens array plate according to claim 1,
    wherein at least one of the first aperture and the second aperture is formed such that the aperture diameter facing the lens is larger than the lens diameter.

3. The erecting equal-magnification lens array plate according to claim 1,
    wherein at least one of the first aperture and the second aperture is formed such that the aperture diameter is tapered so that it is progressively smaller away from the lens side and toward the opposite side.

4. The erecting equal-magnification lens array plate according to claim 1,
    wherein a light shielding member is provided in at least one of the first and fourth surfaces to cover an area between adjacent lenses.

5. The erecting equal-magnification lens array plate according to claim 1,
    wherein an area between adjacent lenses on at least one of the first and fourth surfaces is coarsened.

6. An optical scanning unit comprising:
    a line light source configured to illuminate an image to be read;
    the erecting equal-magnification lens array plate according to claim 1 configured to condense light reflected by the image to be read; and
    a line image sensor configured to receive light transmitted by the erecting equal-magnification lens array plate.

7. An image reading device comprising:
    the optical scanning unit according to claim 6; and
    an image processing unit configured to process an image signal detected by the optical scanning unit.

* * * * *